United States Patent
Porat et al.

(10) Patent No.: US 11,281,856 B2
(45) Date of Patent: Mar. 22, 2022

(54) SYSTEMS AND METHODS FOR USING DYNAMIC REFERENCE GRAPHS TO ACCURATELY ALIGN SEQUENCE READS

(71) Applicant: GNX DATA SYSTEMS LTD., Tel Aviv (IL)

(72) Inventors: Yuval Porat, Tel Aviv (IL); Moshe Einhorn, Tel Aviv (IL); Amir Trabelsi, Tel Aviv (IL)

(73) Assignee: GNX DATA SYSTEMS LTD., Tel Aviv (IL)

( * ) Notice: Subject to any disclaimer, the term of this patent is extended or adjusted under 35 U.S.C. 154(b) by 36 days.

(21) Appl. No.: 16/883,816

(22) Filed: May 26, 2020

(65) Prior Publication Data

US 2020/0387669 A1    Dec. 10, 2020

Related U.S. Application Data

(60) Provisional application No. 62/852,905, filed on May 24, 2019.

(51) Int. Cl.
*G06F 40/279*    (2020.01)

(52) U.S. Cl.
CPC ................. *G06F 40/279* (2020.01)

(58) Field of Classification Search
CPC .............. G06F 40/279; G06K 2209/01; G06K 9/6202; G06K 9/6878
USPC ......................................................... 704/9
See application file for complete search history.

(56) References Cited

U.S. PATENT DOCUMENTS

| 2011/0124111 A1 | 5/2011 | Hoshizaki et al. |
| 2011/0128545 A1 | 6/2011 | Cox et al. |

FOREIGN PATENT DOCUMENTS

WO    2006/084132 A2    8/2006

OTHER PUBLICATIONS

Sambrook, et al., "Molecular Cloning: A Laboratory Manual," Third Ed., Cold Spring Harbor Laboratory Press, Cold Spring Harbor, NY Jan. 2001, Abstract.

*Primary Examiner* — Thierry L Pham
(74) *Attorney, Agent, or Firm* — Haynes and Boone, LLP; Roger C. Kuan

(57) ABSTRACT

A method for matching character strings to a reference character string is disclosed. One or more processors receive a plurality of character strings. The one or more processors match each of the plurality of character strings to a main reference character string and registers a match to positions on the main reference character string that satisfy a pre-set match criteria. The one or more processors match each of the plurality of character strings to an alternate reference character string and registers a match to positions on the alternate reference character string that satisfy the pre-set match criteria. The alternate reference character string is derived from the main character string. The one or more processors identifies a match for each of the plurality of character strings that match to either a position on the main reference character string or the alternate reference character string.

21 Claims, 8 Drawing Sheets

Specification includes a Sequence Listing.

SEQUENCE LISTING

<160> NUMBER OF SEQ ID NOS: 7

<210> SEQ ID NO 1
<211> LENGTH: 31
<212> TYPE: DNA
<213> ORGANISM: Artificial Sequence
<220> FEATURE:
<223> OTHER INFORMATION: Synthetic primer

<400> SEQUENCE: 1
tttaaatctg tggggttaat cggcgggcta a                          31

<210> SEQ ID NO 2
<211> LENGTH: 13
<212> TYPE: DNA
<213> ORGANISM: Artificial Sequence
<220> FEATURE:
<223> OTHER INFORMATION: Synthetic primer

<400> SEQUENCE: 2
tttaaatctg tgg                                              13

<210> SEQ ID NO 3
<211> LENGTH: 12
<212> TYPE: DNA
<213> ORGANISM: Artificial Sequence
<220> FEATURE:
<223> OTHER INFORMATION: Synthetic primer

<400> SEQUENCE: 3
tcggcgggct aa                                               12

<210> SEQ ID NO 4
<211> LENGTH: 11
<212> TYPE: DNA
<213> ORGANISM: Artificial Sequence
<220> FEATURE:
<223> OTHER INFORMATION: Synthetic primer

<400> SEQUENCE: 4
taaatctggg g                                                11

<210> SEQ ID NO 5
<211> LENGTH: 10
<212> TYPE: DNA
<213> ORGANISM: Artificial Sequence
<220> FEATURE:
<223> OTHER INFORMATION: Synthetic primer

<400> SEQUENCE: 5
atctgtgggg                                                  10

<210> SEQ ID NO 6
<211> LENGTH: 10
<212> TYPE: DNA
<213> ORGANISM: Artificial Sequence
<220> FEATURE:
<223> OTHER INFORMATION: Synthetic primer

<400> SEQUENCE: 6
tgtggggtta                                                  10

<210> SEQ ID NO 7
<211> LENGTH: 10
<212> TYPE: DNA
<213> ORGANISM: Artificial Sequence
<220> FEATURE:
<223> OTHER INFORMATION: Synthetic primer

<400> SEQUENCE: 7
gttaatcggc                                                  10

SYSTEMS AND METHODS FOR USING DYNAMIC REFERENCE GRAPHS TO ACCURATELY ALIGN SEQUENCE READS

CROSS-REFERENCE OF RELATED APPLICATION

This application claims the benefit under 35 U.S.C. § 119(e) of U.S. Provisional Application No. 62/852,905, filed May 24, 2019. The disclosure of the above-identified application is incorporated herein by reference as if set forth in full.

FIELD

The embodiments disclosed herein are generally directed towards computational biology. More specifically, to systems and methods for aligning (mapping) biological sequencing (e.g., genomic, protein, etc.) reads in order to reassemble them and identify and/or characterize similarities (or differences) between biological sequences.

BACKGROUND

Biological (e.g., nucleic acid, protein, etc.) sequence information can be used a number of commercial and academic research applications. For example, nucleic acid sequence information can facilitate medical studies of active disease and genetic disease predispositions, and can assist in design of drugs (e.g., targeting specific diseases, avoiding unwanted side effects, improving potency, and the like). Sequence information can also be a basis for genomic and evolutionary studies and many genetic engineering applications. Reliable sequence information can be critical for other uses of sequence data, such as paternity tests, genealogy, criminal investigations and forensic studies.

Research into accurate, fast and efficient nucleic acid (e.g., genome, exome, etc.) sequence assembly methods is vital to the sequencing industry as Next Generation Sequencing (NGS) technologies can provide ultra-high throughput nucleic acid sequencing. As such sequencing systems incorporating NGS technologies can produce a large number of short sequence reads in a relatively short amount time. Sequence assembly methods must be able to assemble and/or map a large number of reads accurately and efficiently (i.e., minimize use of computational resources). For example, the sequencing of a human size genome can result in tens or hundreds of millions of reads that need to be assembled before they can be further analyzed to determine their biological, diagnostic and/or therapeutic relevance.

Genomic sequence assembly can generally be divided into two broad categories: de novo assembly and reference genome mapping assembly. In de novo assembly, sequence reads are assembled together so that they form a new and previously unknown sequence. Whereas in reference genome mapping, sequence reads are assembled against an existing backbone sequence (e.g., reference sequence, etc.) to build a sequence that is similar but not necessarily identical to the backbone sequence.

Conventional mapping tools (e.g., MAQ, BFAST, SHRiMP, BWA, etc.) align reads against a single static reference genome and so do not always align sequences with high accuracy which may result in the incorrect identification of genomic features (e.g., variants, etc.) and can be computationally intensive. Therefore, there is a need for improved mapping tools that can accurately and efficiently align sequence reads to ensure correct identification of genomic features of interest.

SUMMARY

In one aspect, a method for matching character strings to a reference character string, is disclosed. One or more processors receive a plurality of character strings.

The one or more processors match each of the plurality of character strings to a main reference character string and registers a match to positions on the main reference character string that satisfy a pre-set match criteria.

The one or more processors match each of the plurality of character strings to an alternate reference character string and registers a match to positions on the alternate reference character string that satisfy the pre-set match criteria. The alternate reference character string is derived from the main character string.

The one or more processors identifies a match for each of the plurality of character strings that match to either a position on the main reference character string or the alternate reference character string.

In another aspect, a system for matching character strings to a reference character string, is disclosed. The system includes a data store, a computing device and a display.

The data store is configured to store a plurality of character strings. The computing device is communicatively connected to the data store and is comprised of a main path index store, an alternate path index store and a matching engine. The main path index store configured to store a main reference character string. The alternate path index store configured to store one or more alternate reference character strings.

The matching engine is configured to: receive the plurality of character strings, the main reference character string and one or more alternate reference character strings, match each of the plurality of character strings to the main reference character string and register a match to positions on the main reference character string that satisfy a pre-set match criteria, match each of the plurality of character strings to the alternate reference character string and register a match to positions on the alternate reference character string that satisfy the pre-set match criteria, wherein the alternate reference character string is derived from the main character string, and identify a match for each of the plurality of character strings that match to either a position on the main reference character string or the alternate reference character string.

The display is communicatively connected to the computing device and configured to display a report or graphic containing the matched character strings.

BRIEF DESCRIPTION OF THE DRAWINGS

For a more complete understanding of the principles disclosed herein, and the advantages thereof, reference is now made to the following descriptions taken in conjunction with the accompanying drawings, in which.

DETAILED DESCRIPTION

Figure 1:
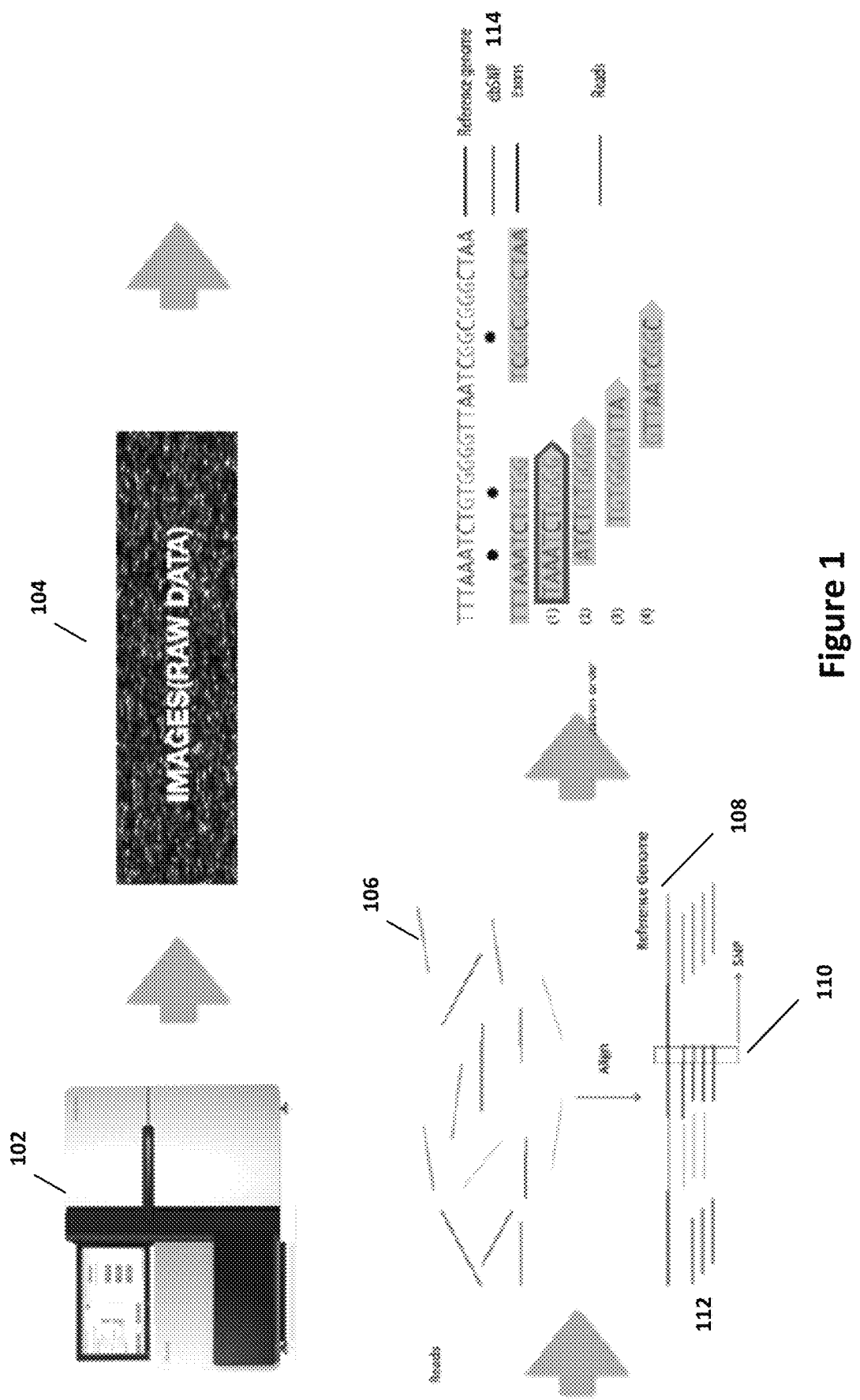
FIG. 1 is a schematic illustration of a conventional NGS sequencing and data analysis workflow, in accordance with various embodiments.

This specification and the accompany figures describe exemplary embodiments of systems and methods for accurately and efficiently aligning genomic sequencing reads to a reference sequence in order to reassemble them and identify similarities (or differences) between the reassembled sequences.

Specifically, the embodiments disclosed herein provide systems and methods for aligning raw sequencing data, which are superior to conventional methods in terms of accuracy. Having a more accurate process has two immediate benefits: (1) sequencing can be done in a lower depth, which reduces cost. This is true because one of the reasons for high-depth sequencing is the low accuracy of both the sequencing and data processing, and (2) offer the ability to perform genetic tests using NGS when today they are done using other technologies/assays, since NGS is not accurate enough to perform them due to the limitations of the NGS sequencing data.

Example of such tests would be polymorphic regions (HLA/immune, donor matching), family based alignment, somatic variants using alignment of tumor vs healthy DNA of probain, single cell NGS (low coverage), homologies (eg HBA), etc.

The disclosure, however, is not limited to these exemplary embodiments and applications or to the manner in which the exemplary embodiments and applications operate or are described herein. Moreover, the figures may show simplified or partial views, and the dimensions of elements in the figures may be exaggerated or otherwise not in proportion. In addition, as the terms "on," "attached to," "connected to," "coupled to," or similar words are used herein, one element (e.g., a material, a layer, a substrate, etc.) can be "on," "attached to," "connected to," or "coupled to" another element regardless of whether the one element is directly on, attached to, connected to, or coupled to the other element or there are one or more intervening elements between the one element and the other element. In addition, where reference is made to a list of elements (e.g., elements a, b, c), such reference is intended to include any one of the listed elements by itself, any combination of less than all of the listed elements, and/or a combination of all of the listed elements. Section divisions in the specification are for ease of review only and do not limit any combination of elements discussed.

Unless otherwise defined, scientific and technical terms used in connection with the present teachings described herein shall have the meanings that are commonly understood by those of ordinary skill in the art. Further, unless otherwise required by context, singular terms shall include pluralities and plural terms shall include the singular. Generally, nomenclatures utilized in connection with, and techniques of, cell and tissue culture, molecular biology, and protein and oligo- or polynucleotide chemistry and hybridization described herein are those well known and commonly used in the art. Standard techniques are used, for example, for nucleic acid purification and preparation, chemical analysis, recombinant nucleic acid, and oligonucleotide synthesis. Enzymatic reactions and purification techniques are performed according to manufacturer's specifications or as commonly accomplished in the art or as described herein. The techniques and procedures described herein are generally performed according to conventional methods well known in the art and as described in various general and more specific references that are cited and discussed throughout the instant specification. See, e.g., Sambrook et al., Molecular Cloning: A Laboratory Manual (Third ed., Cold Spring Harbor Laboratory Press, Cold Spring Harbor, N.Y. 2001). The nomenclatures utilized in connection with, and the laboratory procedures and techniques described herein are those well known and commonly used in the art.

The phrase "next generation sequencing" (NGS) refers to sequencing technologies having increased throughput as compared to traditional Sanger- and capillary electrophoresis-based approaches, for example with the ability to generate hundreds of thousands of relatively small sequence reads at a time. Some examples of next generation sequencing techniques include, but are not limited to, sequencing by synthesis, sequencing by ligation, and sequencing by hybridization. More specifically, the MISEQ, HISEQ, NEXTSEQ, and NOVASEQ Systems of Illumina and the Personal Genome Machine (PGM) and SOLiD Sequencing System of Life Technologies Corp. provide massively parallel sequencing of whole or targeted genomes. The SOLiD System and associated workflows, protocols, chemistries, etc. are described in more detail in PCT Publication No. WO 2006/084132, entitled "Reagents, Methods, and Libraries for Bead-Based Sequencing," international filing date Feb. 1, 2006; U.S. patent application Ser. No. 12/873,190 (U.S. Application Publication No. US 2011/0124111 A1; published May 26, 2011), entitled "Low-Volume Sequencing System and Method of Use," filed on Aug. 31, 2010; and U.S. patent application Ser. No. 12/873,132 (U.S. Application Publication No. US 2011/0128545 A1; published Jun. 2, 2011), entitled "Fast-Indexing Filter Wheel and Method of Use," filed on Aug. 31, 2010, the entirety of each of these applications being incorporated herein by reference thereto.

The phrase "sequencing run" refers to any step or portion of a sequencing experiment performed to determine some information relating to at least one biomolecule (e.g., nucleic acid molecule).

As used herein, the phrase "genomic features" can refer to a genome region with some annotated function (e.g., a gene, protein coding sequence, mRNA, tRNA, rRNA, repeat sequence, inverted repeat, miRNA, siRNA, etc.) or a genetic/genomic variant (e.g., single nucleotide polymorphism/variant, insertion/deletion sequence, copy number variation, inversion, etc.) which denotes a single or a grouping of genes (in DNA or RNA) that have undergone changes as referenced against a particular species or sub-populations within a particular species due to mutations, recombination/crossover or genetic drift.

Genomic variants can be identified using a variety of techniques, including, but not limited to: array-based methods (e.g., DNA microarrays, etc.), real-time/digital/quantitative PCR instrument methods and whole or targeted nucleic acid sequencing systems (e.g., NGS systems, Capillary Electrophoresis systems, etc.). With nucleic acid sequencing, coverage data can be available at single base resolution.

DNA (deoxyribonucleic acid) is a chain of nucleotides consisting of 4 types of nucleotides; A (adenine), T (thymine), C (cytosine), and G (guanine), and that RNA (ribonucleic acid) is comprised of 4 types of nucleotides; A, U (uracil), G, and C. Certain pairs of nucleotides specifically bind to one another in a complementary fashion (called complementary base pairing). That is, adenine (A) pairs with thymine (T) (in the case of RNA, however, adenine (A) pairs with uracil (U)), and cytosine (C) pairs with guanine (G). When a first nucleic acid strand binds to a second nucleic acid strand made up of nucleotides that are complementary to those in the first strand, the two strands bind to form a double strand. As used herein, "nucleic acid sequencing data," "nucleic acid sequencing information," "nucleic acid sequence," "genomic sequence," "genetic sequence," or "fragment sequence," or "nucleic acid sequencing read" denotes any information or data that is indicative of the order of the nucleotide bases (e.g., adenine, guanine, cytosine, and thymine/uracil) in a molecule (e.g., whole genome, whole transcriptome, exome, oligonucleotide, polynucleotide, fragment, etc.) of DNA or RNA. It should be understood that the present teachings contemplate sequence information obtained using all available varieties of techniques, platforms or technologies, including, but not limited to: capillary electrophoresis, microarrays, ligation-based systems, polymerase-based systems, hybridization-based systems, direct or indirect nucleotide identification systems, pyrosequencing, ion- or pH-based detection systems, electronic signature-based systems, etc.

A "polynucleotide", "nucleic acid", or "oligonucleotide" refers to a linear polymer of nucleosides (including deoxyribonucleosides, ribonucleosides, or analogs thereof) joined by internucleosidic linkages. Typically, a polynucleotide comprises at least three nucleosides. Usually oligonucleotides range in size from a few monomeric units, e.g. 3-4, to several hundreds of monomeric units. Whenever a polynucleotide such as an oligonucleotide is represented by a sequence of letters, such as "ATGCCTG," it will be understood that the nucleotides are in 5'→3' order from left to right and that "A" denotes deoxyadenosine, "C" denotes deoxycytidine, "G" denotes deoxyguanosine, and "T" denotes thymidine, unless otherwise noted. The letters A, C, G, and T may be used to refer to the bases themselves, to nucleosides, or to nucleotides comprising the bases, as is standard in the art.

The phrase "fragment library" refers to a collection of nucleic acid fragments, wherein one or more fragments are used as a sequencing template. A fragment library can be generated, for example, by cutting or shearing a larger nucleic acid into smaller fragments. Fragment libraries can be generated from naturally occurring nucleic acids, such as mammalian or bacterial nucleic acids. Libraries comprising similarly sized synthetic nucleic acid sequences can also be generated to create a synthetic fragment library.

In various embodiments, a sequence alignment method can align a fragment sequence to a reference sequence or another fragment sequence. The fragment sequence can be obtained from a fragment library, a paired-end library, a mate-pair library, a concatenated fragment library, or another type of library that may be reflected or represented by nucleic acid sequence information including for example, RNA, DNA, and protein based sequence information. Generally, the length of the fragment sequence can be substantially less than the length of the reference sequence. The fragment sequence and the reference sequence can each include a sequence of symbols. The alignment of the fragment sequence and the reference sequence can include any number of mismatches between the symbols of the fragment sequence and the symbols of the reference sequence. Generally, the fragment sequence can be aligned to a portion of the reference sequence in order to minimize the number of mismatches between the fragment sequence and the reference sequence.

In particular embodiments, the symbols of the fragment sequence and the reference sequence can represent the composition of biomolecules. For example, the symbols can correspond to identity of nucleotides in a nucleic acid, such as RNA or DNA, or the identity of amino acids in a protein. In some embodiments, the symbols can have a direct correlation to these subcomponents of the biomolecules. For example, each symbol can represent a single base of a polynucleotide. In other embodiments, each symbol can represent two or more adjacent subcomponent of the biomolecules, such as two adjacent bases of a polynucleotide. Additionally, the symbols can represent overlapping sets of adjacent subcomponents or distinct sets of adjacent subcomponents. For example, when each symbol represents two adjacent bases of a polynucleotide, two adjacent symbols representing overlapping sets can correspond to three bases of polynucleotide sequence, whereas two adjacent symbols representing distinct sets can represent a sequence of four bases. Further, the symbols can correspond directly to the subcomponents, such as nucleotides, or they can correspond to a color call or other indirect measure of the subcomponents. For example, the symbols can correspond to an incorporation or non-incorporation for a particular nucleotide flow.

In various embodiments, a computer program product can include instructions to select a contiguous portion of a fragment sequence; instructions to map the contiguous portion of the fragment sequence to a reference sequence using an approximate string matching method that produces at least one match of the contiguous portion to the reference sequence.

In various embodiments, a system for nucleic acid sequence analysis can include a data analysis unit. The data analysis unit can be configured to obtain a fragment sequence from a sequencing instrument, obtain a reference sequence, select a contiguous portion of the fragment sequence, and map the contiguous portion of the fragment sequence to the reference sequence using an approximate string mapping method that produces at least one match of the contiguous portion to the reference sequence.

As used herein, "substantially" means sufficient to work for the intended purpose. The term "substantially" thus allows for minor, insignificant variations from an absolute or perfect state, dimension, measurement, result, or the like such as would be expected by a person of ordinary skill in the field but that do not appreciably affect overall performance. When used with respect to numerical values or parameters or characteristics that can be expressed as numerical values, "substantially" means within ten percent.

The term "ones" means more than one.

As used herein, the term "plurality" can be 2, 3, 4, 5, 6, 7, 8, 9, 10, or more.

As used herein, the term "cell" is used interchangeably with the term "biological cell." Non-limiting examples of biological cells include eukaryotic cells, plant cells, animal cells, such as mammalian cells, reptilian cells, avian cells, fish cells, or the like, prokaryotic cells, bacterial cells, fungal cells, protozoan cells, or the like, cells dissociated from a tissue, such as muscle, cartilage, fat, skin, liver, lung, neural tissue, and the like, immunological cells, such as T cells, B cells, natural killer cells, macrophages, and the like, embryos (e.g., zygotes), oocytes, ova, sperm cells, hybridomas, cultured cells, cells from a cell line, cancer cells, infected cells, transfected and/or transformed cells, reporter cells, and the like. A mammalian cell can be, for example, from a human, a mouse, a rat, a horse, a goat, a sheep, a cow, a primate, or the like.

As used herein, the term "character string" is a linear sequence of two or more characters.

As used herein, the term "character" is any symbol or alphanumeric mark that represents information.

Conventional Methods for Aligning Sequence Reads

FIG. 1 is a schematic illustration of a conventional NGS sequencing and data analysis workflow, in accordance with various embodiments.

As depicted herein, a NGS sequencer 102 sequences a plurality of genomic (DNA or RNA) fragments obtained from a biological sample to obtain raw imaging data 104 that is then converted into a plurality of individual fragment sequence reads 106. Each of the individual sequence reads 106 can then be aligned to a static reference genome (or sequence segment) 108 to reassemble the genomic sequence that the plurality of individual sequence reads 106 are derived from and identify genomic variants 110 by comparing against genomic variant databases 114 (SEQ NOs. 1-7). Because the accuracy of NGS sequence reads can vary, conventionally, costly high-depth sequencing techniques (resulting in a large number of overlapping unique reads 112 that include a given nucleotide) are employed to ensure that the genomic variants 110 identified by the workflow are real and not the result of sequencing errors.

Figure 2:
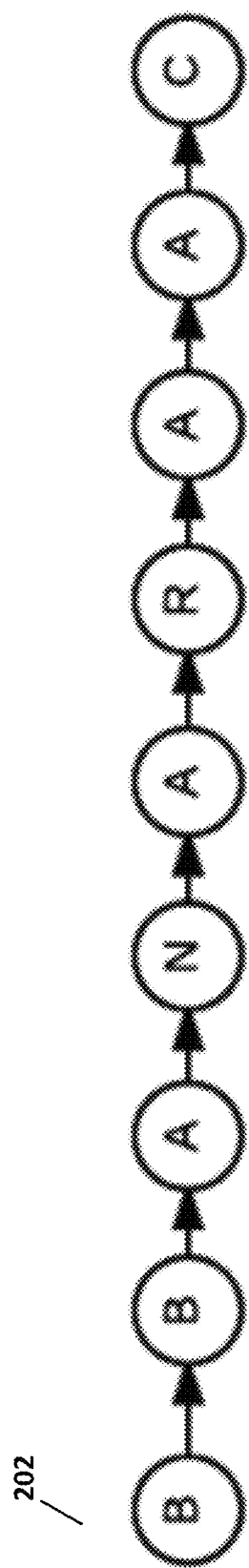
FIG. 2 is an example of a static character string (or static reference genome) used in a conventional reads alignment workflow, in accordance with various embodiments.

FIG. 2 is an example of a static character string (or static reference genome or sequence segment) used in a conventional reads alignment workflow, in accordance with various embodiments.

As depicted herein, a static character string 202 is comprised of a plurality of individual characters that are laid out in one dimension. Each of the individual characters of the static character string 202 represents a nucleotide or base (e.g., adenine, thymine, uracil, cytosine or guanine) and the combination of the string of nucleotides form a static reference genome or transcriptome. In most conventional applications, the static reference genome or transcriptome is population-based. That is, the static reference genome or transcriptome that is a composite genome or transcriptome derived from a population of individuals instead of a single individual. One of the disadvantages of population-based reference genomes or transcriptomes is that they are not very helpful in detecting rare or de novo variants as they are typically not represented in a population genome or transcriptome.

There are two main categories of methods for taking raw NGS sequence reads to reassemble the original DNA or RNA sequence from: de novo assembly and reference genome alignment. De novo assembly is more common for species that haven't been sequenced before. For human sequencing, the most common conventional method is reference sequence alignment. Sequence alignment methods conventionally align each of the sequence reads against a static one-dimensional reference genome (i.e., static character string 202). One of the challenges that these conventional methods deal with is how to do this process efficiently, since the reference genome is very long (over 3 billion nucleotides/bases long for the reference genome of a human).

The most widely used sequence read alignment tool currently is the Burrows-Wheeler Aligner (BWA), which is based on a data structure called Burrows-Wheeler Transform (BWT) and FM-Index. These data structures provide a way to index the reference genome in a "compressed" manner and keep a reasonably efficient alignment against it at O(m).

Systems and Methods for Accurately Aligning Sequence Reads

Figure 3:
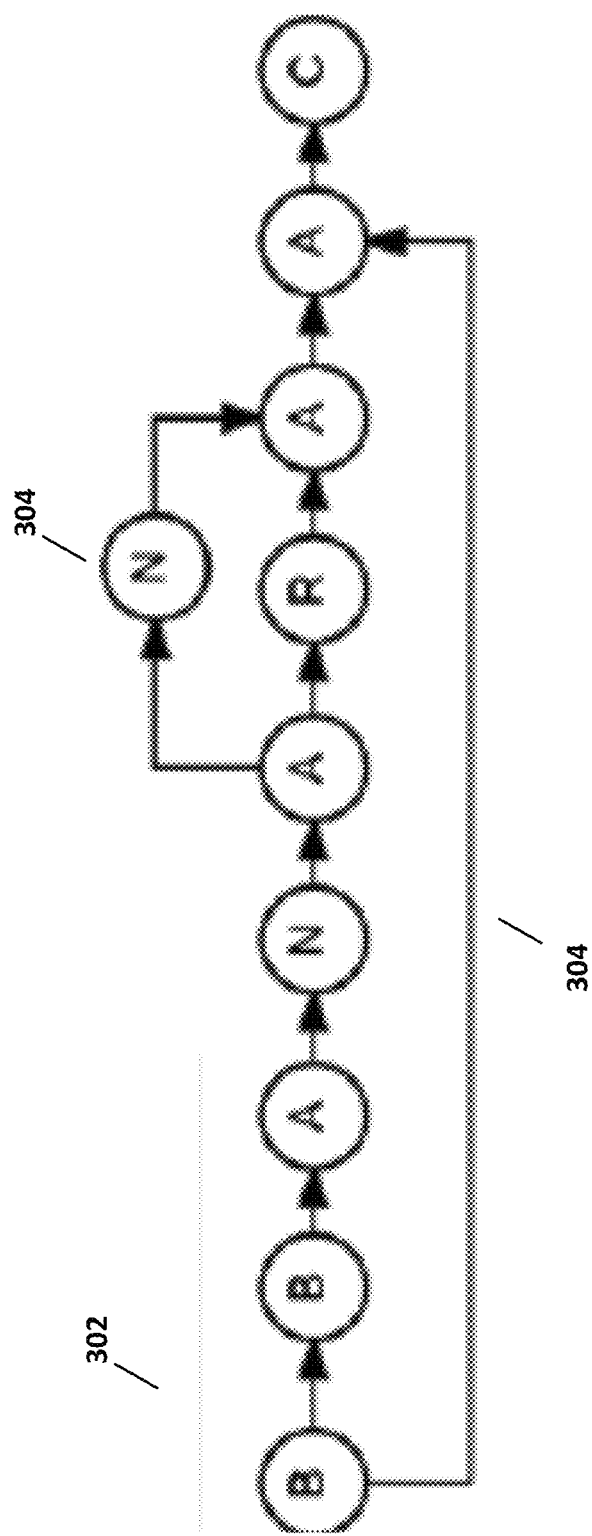
FIG. 3 is an example of a dynamic (graph-based) character string (or reference polynucleotide sequence) used in a novel reads alignment workflow, in accordance with various embodiments.

FIG. 3 is an example of a dynamic (graph-based) character string (or reference polynucleotide sequence) used in a novel reads alignment workflow, in accordance with various embodiments.

As depicted herein, a dynamic character string 302 is comprised of a plurality of individual characters that are laid out in a graph-based structure that allows for one or more alternate character paths 304. For the purposes of alignment of NGS reads, each of the individual characters of the dynamic character string 302 represents a nucleotide (e.g., adenine, thymine, uracil, cytosine or guanine) and the combination of the string of nucleotides form a dynamic reference genome or transcriptome. This approach is advantageous over conventional approaches using a static reference genome as it allows for the gathering of evidence/clues of mismatches from the reads to detect variants that have a high likelihood to exist in the sample and add them to the reference during the alignment or in advance (e.g. from a premade list of potential/common variants for a given the population). With the flexibility that the dynamic reference genome approach provides, a read supporting a de novo variant (which did not exist in the original genome reference), would be added dynamically to the genome reference as an alternate path (i.e., alternate character path 304), and all read alignments following it can account for the alternate path during subsequent alignments.

In various embodiments, each of the individual characters of the dynamic character string 302 represents a nucleotide (e.g., adenine, thymine, uracil, cytosine or guanine). In various embodiments, each of the individual characters of the static character string 202 represents an alphanumeric character. In various embodiments, the static character string 202 is a reference genome (or segment). In various embodiments, the static character string 202 is a reference transcriptome.

Operationally, as described further below, this means that during the alignment process, each time a mismatch, i.e., a variant, which does not exist in the main-path-index (MPI) and on the alternate-path-index (API) is found in a read, the mismatch is added to an alternate path candidates list.

Periodically, an update process takes place, during this process the alternate path candidates list is being continually reviewed, and all potential variants are considered for adding into the alternate-path-index.

Figure 4:
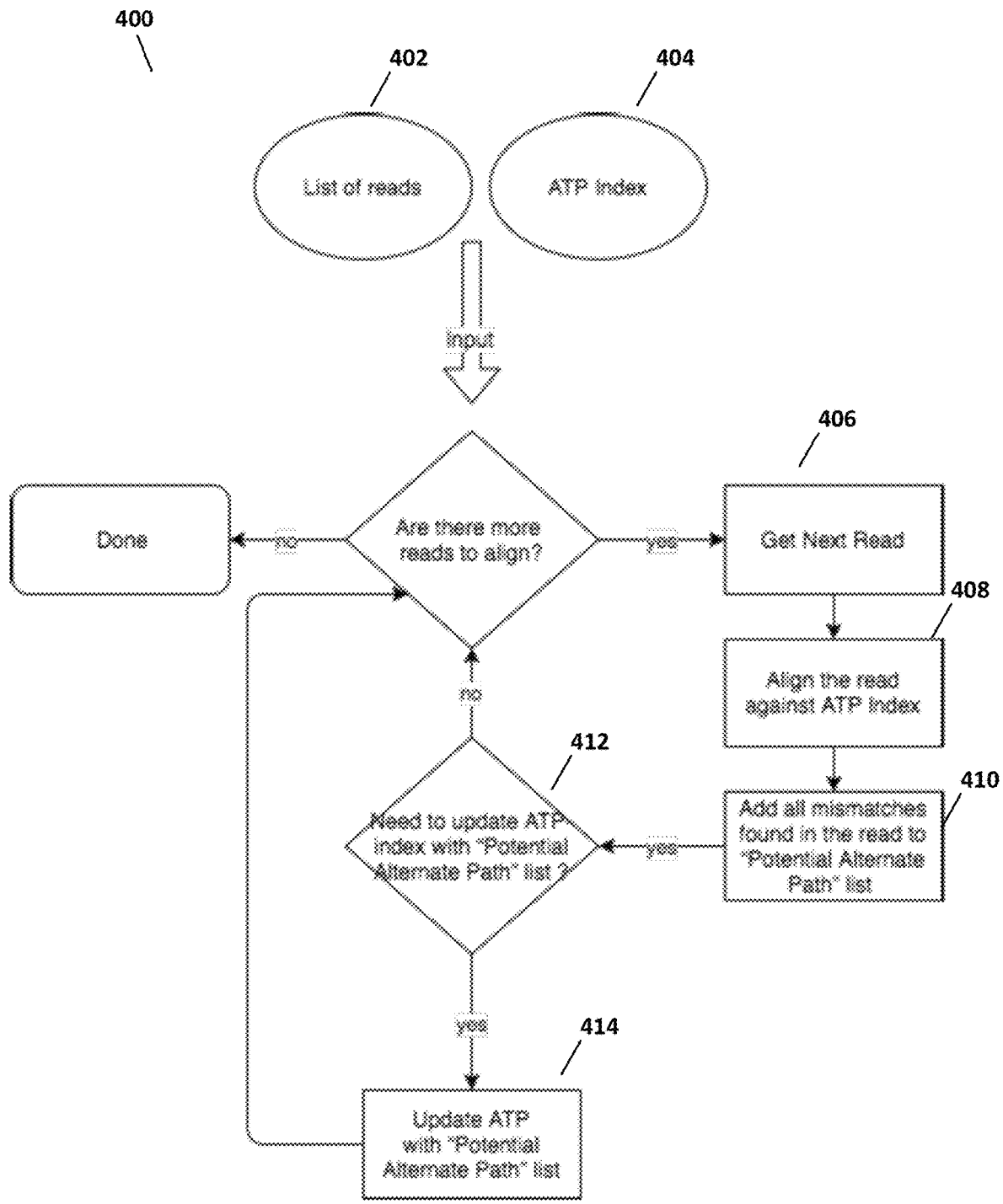
FIG. 4 is a flowchart illustrating how a dynamic (graph-based) character string (or dynamic reference genome) can be updated when character strings (or sequence reads) are aligned (matched) to it, in accordance with various embodiments.

FIG. 4 is a flowchart illustrating how a dynamic (graph-based) character string (or dynamic reference genome) can be updated when character strings (or sequence reads) are aligned (matched) to it, in accordance with various embodiments.

As shown herein, a list of sequence reads 402 and a dynamic reference genome (i.e., ATP Index) 404 are input together into an iterative process that continuously aligns each of the list of sequence reads 402 against the dynamic reference genome 404. Operationally, this starts by first obtaining a sequence read 406 and aligning 408 it against the dynamic reference genome 404. All the mismatches that are found in the read during the alignment are added to a potential alternate paths list 410. A mismatch may include, but is not limited to, a nucleotide or character mismatch, a split read, a paired end mismatch, and more. These mismatches typically result from various kind of variants such as insertion, deletion, copy number variation (CNV), translocation, inversion, single-nucleotide polymorphism (SNP), etc.

A determination 412 is then made, based on one or more criteria, on whether to update 414 the alternate-path-index (that is part of the ATP Index) with the potential alternate path. These criteria, for example, can be based on the number of different reads supporting the same mismatch. If the same mismatch was observed more than once, it would be added.

FIG. 4 just describes the concept of how to use a dynamic reference in order to align sequence reads. However, actually implementing such a reference can be a difficult and computationally challenging. An important consideration for this dynamic approach is that the complexity of aligning a read $O(m)$, where m is the length of the read, against a dynamic reference (ATP Index), should be similar to that of a static reference such that there is no decrease in computational performance. Otherwise, the implementation would be computationally heavy.

Disclosed herein is an approach to solve this seemingly divergent by creating a separation between the main path in the reference and the alternate paths. This can be accomplished by indexing the alternate paths separately from the main path.

Figure 5:
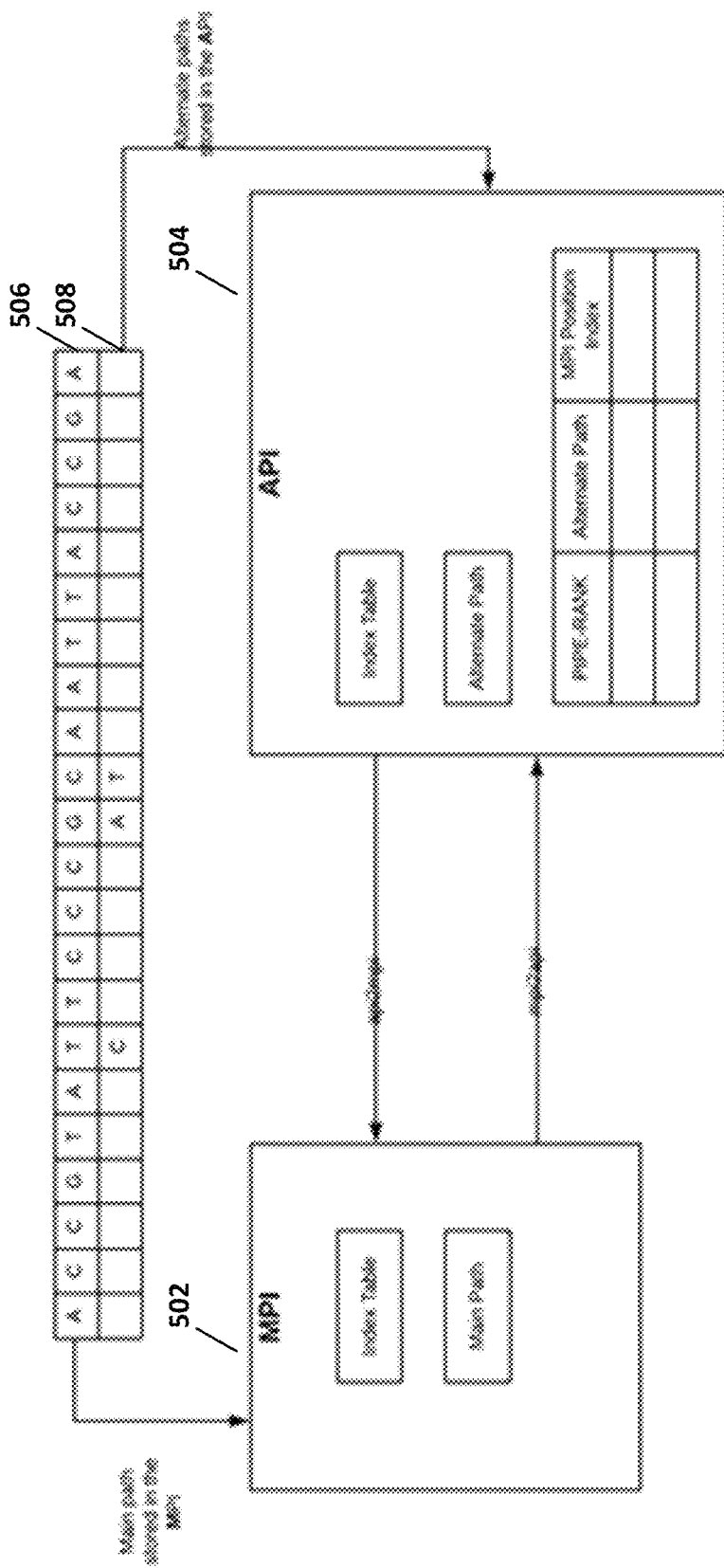
FIG. 5 is a schematic illustration of how character strings (or sequence reads) can be aligned (matched) to a main path index (MPI) and an alternative path index (API) of a dynamic reference character string, in accordance with various embodiments.

Within this operational construct, the main path (or reference) can be the string that represents the consensus between the majority of references in each position and the alternate path (or reference) can be the sequence of characters in any position or sequence of consecutive positions of each reference that are different from the main reference. That is, the main path (or reference) is static and does not change throughout the alignment process while the alternate path (or reference) is built in a way that it can be dynamic FIG. 5 is a schematic illustration of how character strings (or sequence reads) can be aligned (matched) to a main path index (MPI) and an alternative path index (API) of a dynamic reference character string, in accordance with various embodiments.

As depicted herein, each of the plurality of character strings (i.e., read sequences) are simultaneously matched against the main path sequence stored in the MPI index 502 and the alternate path sequences 508 stored in the API index 504.

Therefore, there are effectively two separate data structures (MPI and API) for the same index (reference genome) allow both to be used simultaneously when looking for potential alignments of a read sequence (or character string). This method is based on the fact that the API is indexed not only according to the data being indexed in the alternate path, but also to the positions of each alternate path in the MPI.

In various embodiments, the MPI is a data structure that holds the index over the main path of the reference genome (a single genome reference). Its purpose is to provide an index for a single-path reference genome. The creation process is performed in advance and can take a lot of resources (memory/time), but once created, a sequence read of length m can be queried at $O(m)$, where m is the length of the read, to see if it exists in the reference. That is, the MPI can essentially be a traditional FM Index (or a data structure with similar properties) on the main path of the graph. However, several index positions are taken on to help in the construction of the API and transitions processes.

Specifically, in case the MPI is based on a FM Index, the bwt (part of the FM Index) of the main path is interrogated to maintain a list of all the bwt positions on which an alternate path is branched out in the original main path reference. This list of bwt positions can then be sorted by position and the enumeration index of each position is correlated with the corresponding alternate path (variation). These are called variation ranks or alternate path rank.

In various embodiments, the API is a data structure that holds the index over all the alternate paths (i.e. all deltas of other reference genomes compared to the one in the main path). An API data structure holding all the alternate paths can allow for an efficient search of potential alignments for a read sequence. In various embodiments, the existing data structures are used in order to achieve this but extending their functionality. These existing data structures allow for querying of a large character string at complexity of the queried string as low as $O(m)$. Examples of data structures that would enable this are, but not limited to: FM-Index, BWT, Hash Table, Suffix-array, Suffix-tree, etc.

That is, the API is a structure that can encode all the alternate paths (i.e., any path that is not on the main path) in the graph-based data structure into a single index that allows for efficient queries for matching a sequence of characters (i.e., bases) with any of these alternate paths. This structure may be similar to the structure of an FM index, or a data structure with similar properties, with a few key differences that allow for efficient branching between querying the MPI and the API (basically querying all alternate paths that may exist on a particular read position at the same time).

In various embodiments, the string that the API indexes is called the vref. The vref is a concatenation of all alternate paths together (occasionally the alternate path is extended with a "padding" sequence, described below) and a newly introduced character (e.g., 'P', called Pipe, as a delimiter between each alternate path). This way, whenever the character string matching reaches base 'P' during a search, it means that the alternate path has ended and that the search continues on the MPI from the current position and a mapping between each 'P' in the MPI and its corresponding position in the MPI's bwt is kept as part of the index and used in a subsequent API to MPI process).

In various embodiments, each of the pipes is subscripted with a unique rank, identical to the variation rank of the specific alternate path starting at this pipe. Once a rank is given to each base pipe (the "pipe rank"), it is used as a secondary sort (second to the primary alphabetical sort usually used in an FM index construction) when the bwt of the API is constructed from the vref. This secondary sort is the main difference between the API's structure and a regular FM index.

Figure 6:
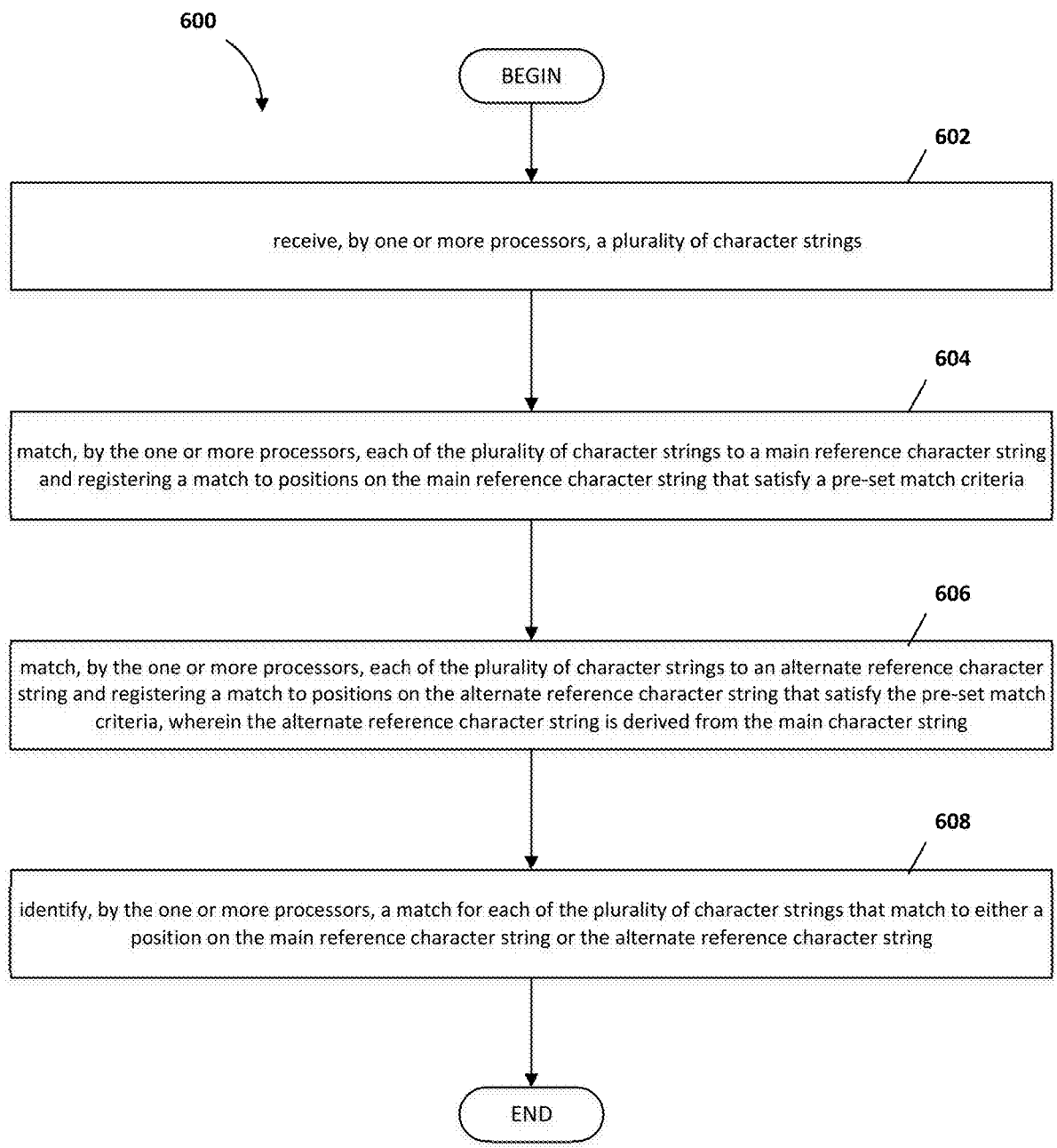
FIG. 6 is a flowchart illustrating a non-limiting example method for aligning (matching) a plurality of character strings (or sequence reads) to a dynamic (graph-based) character string, in accordance with various embodiments.

FIG. 6 is a flowchart illustrating a non-limiting example method for aligning (matching) a plurality of character strings (or sequence reads) to a dynamic (graph-based) character string, in accordance with various embodiments.

The method 600 can comprise, at step 602, receiving, by one or more processors, a plurality of character strings. In various embodiments, each of the plurality of character strings can be a polynucleotide sequence. In various embodiments, the plurality of character strings can be an alphanumeric sequence.

The method 600 can further comprise, at step 604, matching, by the one or more processors, each of the plurality of character strings to a main reference character string (i.e., main path sequence) and registering a match to positions on the main reference character string that satisfy a pre-set match criteria. In various embodiments, the main reference character string can be a reference polynucleotide sequence (i.e., reference genome). In various embodiments, the main reference character string can be a polynucleotide sequence that is derived from an individual. In various embodiments, the main reference character string can be a polynucleotide sequence that derived from a population of individuals. In various embodiments, the pre-set match criteria is a set number of mismatched characters (i.e., nucleotides) between each of the plurality of character strings and the main reference character string. In various embodiments, the pre-set match criteria is a set number of mismatched characters (i.e., nucleotides) between each of the plurality of character strings and the main reference character string. In some embodiments, the pre-set match criteria is a set number of consecutive mismatched characters (i.e., nucleotides) between each of the plurality of character strings and the main reference character string. In various embodiments, the pre-set match criteria is a set number derived from the mismatched characters (i.e., nucleotides) between each of the plurality of character strings and the main reference character string.

The method 600 can further comprise, at step 606, matching, by the one or more processors, each of the plurality of character strings to an alternate reference character string (i.e., alternate path sequence) and registering a match to positions on the alternate reference character string that satisfy a pre-set match criteria. In various embodiments, the alternate reference character string is comprised of a plurality of nucleotides or bases (e.g., adenine, thymine, uracil, cytosine or guanine). In various embodiments, the alternate reference character string differs from the main reference character string by at least one character. In various embodiments, the pre-set match criteria is a set number of mismatched characters (i.e., nucleotides) between each of the plurality of character strings and the alternate reference character string. In various embodiments, the pre-set match criteria is a set number of mismatched characters (i.e., nucleotides) between each of the plurality of character strings and the alternate reference character string. In some embodiments, the pre-set match criteria is a set number of consecutive mismatched characters (i.e., nucleotides) between each of the plurality of character strings and the main reference character string. In various embodiments, the pre-set match criteria is a set number derived from the mismatched characters (i.e., nucleotides) between each of the plurality of character strings and the alternate reference character string.

The method 600 can further comprise, at step 608, identifying, by the one or more processors, a match for each of the plurality of character strings that match to either a position on the main reference character string or the alternate reference character string.

In various embodiments, the method 600 can further include, generating, by the one or more processors, a second alternative reference character string when an attribute is detected once a character string is matched with either the main reference character string or the alternate reference character string. In various embodiments, the attribute is a single character mismatch. In various embodiments, the single character mismatch is a single nucleotide polymorphism.

In various embodiments, the attribute is a non-exact match of a plurality of characters to the main reference character string or alternate reference character string. In various embodiments, the plurality of character mismatches is due to an inversion. In various embodiments, the plurality of character mismatches is due to an insertion. In various embodiments, the plurality of character mismatches is due to an insertion. In various embodiments, the plurality of character mismatches is due to a deletion. In various embodiments, the plurality of character mismatches is due to a duplication. In various embodiments, the character mismatches is due to a translocation. In various embodiments, the attribute is a de novo genomic variant.

In various embodiments, the method 600 can further include, generating, by the one or more processors, a matching score for each of the plurality of character strings that match to either a position on the main reference character string or the alternate reference character string. For example, the matching score can be based on the local Hamming distance between the strings—measuring the minimum number of substitutions required to change one string into the other, or the minimum number of errors that could have transformed one string into the other, the number of positions at which the corresponding symbols are different.

In various embodiments, the method 600 can further include, calling, by the one or more processors, a definitive match for a character string that is matched to both the main reference character string and the alternate reference character string, based on highest matching score for the matched character string.

In various embodiments, the method 600 can further include, calling, by the one or more processors, a definitive match for a character string that is matched to both the main character string and the alternate reference character string, based on highest matching score for the matched character string.

Figure 7:
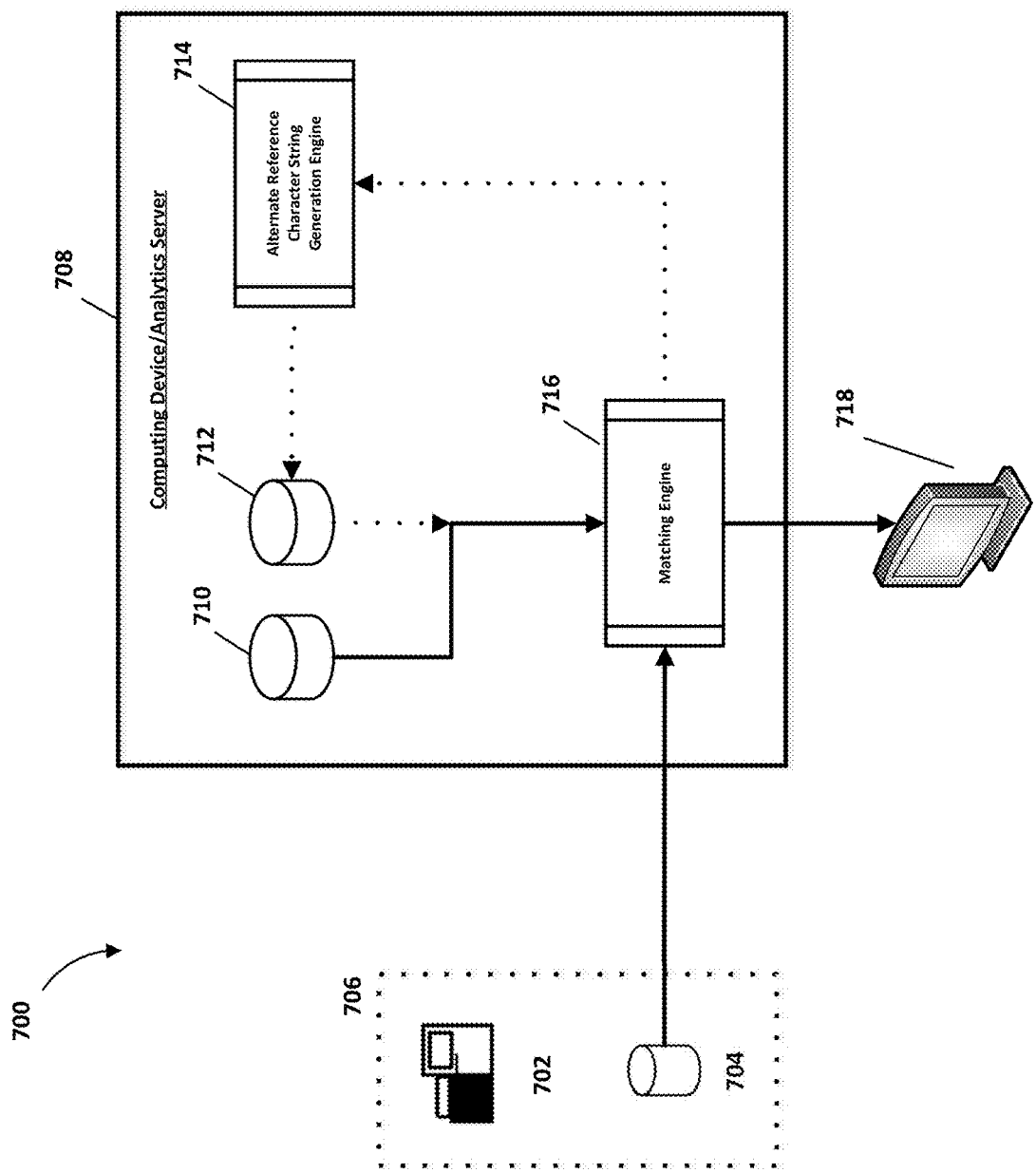
FIG. 7 is a diagram illustrating a non-limiting example system for aligning (matching) a plurality of character strings (or sequence reads) to a dynamic (graph-based) character string, in accordance with various embodiments.

FIG. 7 is a diagram illustrating a non-limiting example system for aligning (matching) a plurality of character strings (or sequence reads) to a dynamic (graph-based) character string, in accordance with various embodiments.

The system 700 includes a genomic sequence analyzer 702, a data storage unit 704, a computing device/analytics server 708, and a display 718.

The genomic sequence analyzer 702 can be communicatively connected to the data storage unit 704 by way of a serial bus (if both form an integrated instrument platform) or by way of a network connection (if both are distributed/separate devices). The genomic sequence analyzer 702 can be configured to process and generate one or more genomic sequence datasets. The genomic sequence analyzer 702 can be any next-generation sequencing platform or sequencer such as, but not limited to: Illumina® sequencer, MiSeg™, NextSeg™ 500/550 (High Output), HiSeq 2500™ (Rapid Run), HiSeq™ 3000/4000, and NovaSeq.

In various embodiments, the generated genomic sequence datasets can then be stored in the data storage unit 704 for subsequent processing. In various embodiments, one or more raw genomic sequence datasets can also be stored in the data storage unit 704 prior to processing and analyzing. Accordingly, in various embodiments, the data storage unit 704 is configured to store one or more genomic sequence datasets, e.g., the genomic sequence datasets of the various embodiments herein that includes a plurality of fragment sequence reads. In various embodiments, the processed and analyzed genomic sequence datasets can be fed to the computing device/analytics server 708 in real-time for further downstream analysis.

In various embodiments, the data storage unit 704 is communicatively connected to the computing device/analytics server 708. In various embodiments, the data storage unit 704 and the computing device/analytics server 708 can be part of an integrated apparatus. In various embodiments, the data storage unit 704 can be hosted by a different device than the computing device/analytics server 708. In various embodiments, the data storage unit 704 and the computing device/analytics server 708 can be part of a distributed network system. In various embodiments, the computing device/analytics server 708 can be communicatively connected to the data storage unit 704 via a network connection that can be either a "hardwired" physical network connection (e.g., Internet, LAN, WAN, VPN, etc.) or a wireless network connection (e.g., Wi-Fi, WLAN, etc.). In various embodiments, the computing device/analytics server 708 can be a workstation, mainframe computer, distributed computing node (part of a "cloud computing" or distributed networking system), personal computer, mobile device, etc.

In various embodiments, the computing device/analytics server 708 is configured to host a main path index store 710, an alternate path index store 712, and a matching engine 716.

In various embodiments, the main path index store 710 can be configured to store one or more main reference character strings. In various embodiments, the main reference character string can be a reference polynucleotide sequence (i.e., reference genome). In various embodiments, the main reference character string can be a polynucleotide sequence that is derived from an individual. In various embodiments, the main reference character string can be a polynucleotide sequence that derived from a population of individuals.

In various embodiments, the alternate path index store 712 can be configured to store one or more alternate reference character strings. In various embodiments, the alternate reference character string is comprised of a plurality of nucleotides or bases (e.g., adenine, thymine, uracil, cytosine or guanine). In various embodiments, the alternate reference character string differs from the main reference character string by at least one character.

In various embodiments, the matching engine 716 can be configured to receive the plurality of character strings, the main reference character string and one or more alternate reference character strings. Next, it matches each of the plurality of character strings to the main reference character string and register a match to positions on the main reference character string that satisfy a pre-set match criteria. Next, it matches each of the plurality of character strings to the alternate reference character string and register a match to positions on the alternate reference character string that satisfy the pre-set match criteria, wherein the alternate reference character string is derived from the main character string. Finally, it identifies a match for each of the plurality of character strings that match to either a position on the main reference character string or the alternate reference character string.

In various embodiments, the pre-set match criteria is a set number of mismatched characters (i.e., nucleotides) between each of the plurality of character strings and the main reference character string or alternate reference character string. In various embodiments, the pre-set match criteria is a set number of mismatched characters (i.e., nucleotides) between each of the plurality of character strings and the main reference character string or alternate reference character string. In some embodiments, the pre-set match criteria is a set number of consecutive mismatched characters (i.e., nucleotides) between each of the plurality of character strings and the main reference character string. In various embodiments, the pre-set match criteria is a set number derived from the mismatched characters (i.e., nucleotides) between each of the plurality of character strings and the main reference character string or alternate referenced character string.

In various embodiment, the matching engine 716 can be further configured to generate a matching score for each of the plurality of character strings that match to either a position on the main reference character string or the alternate reference character string.

In various embodiments, the matching engine 716 can be further configured to call a definitive match for a character string that is matched to both the main reference character string and the alternate reference character string, based on highest matching score for the matched character string.

In various embodiments, the matching engine 716 can be further configured to call a definitive match for a character string that is matched to both the main character string and the alternate reference character string, based on highest matching score for the matched character string.

In various embodiments, the computing device/analytics server 708 can be further configured to host an alternate reference character string generation engine 714. The alternate reference character string generation engine 714 can be configured to generate a second alternate reference character string when an attribute is detected once a character string is matched with either the main reference character string or the alternate reference character string.

In various embodiments, the attribute is a single character mismatch. In various embodiments, the single character mismatch is a single nucleotide polymorphism.

In various embodiments, the attribute is a non-exact match of a plurality of characters to the main reference character string or alternate reference character string. In various embodiments, the plurality of character mismatches is due to an inversion. In various embodiments, the plurality of character mismatches is due to an insertion. In various embodiments, the plurality of character mismatches is due to an insertion. In various embodiments, the plurality of character mismatches is due to a deletion. In various embodiments, the plurality of character mismatches is due to a duplication. In various embodiments, the character mismatches is due to a translocation. In various embodiments, the attribute is a de novo genomic variant.

In various embodiments, the display 718 can be communicatively connected to the computing device/analytics server 708 to display a report or graphic containing the matched character strings.

Computer-Implemented System

In various embodiments, the methods for aligning (matching) a plurality of character strings (or sequence reads) to a dynamic (graph-based) character string can be implemented via computer software or hardware. That is, as depicted in FIG. 7, the methods disclosed herein can be implemented on a computing device/analytics sever 708 hosts a main path index store 710, an alternate path index store 712, and a matching engine 716. In various embodiments, the computing device/analytics sever 708 can be communicatively connected to a genomic sequence analyzer 702, a data store 704, and a display or client terminal 718, via a direct connection or through an internet connection.

It should be appreciated that the various engines depicted in FIG. 7 can be combined or collapsed into a single engine, component or module, depending on the requirements of the particular application or system architecture. Moreover, in various embodiments, the matching engine 716 and the alternate reference character string generation engine 714, can comprise additional engines or components as needed by the particular application or system architecture.

Figure 8:
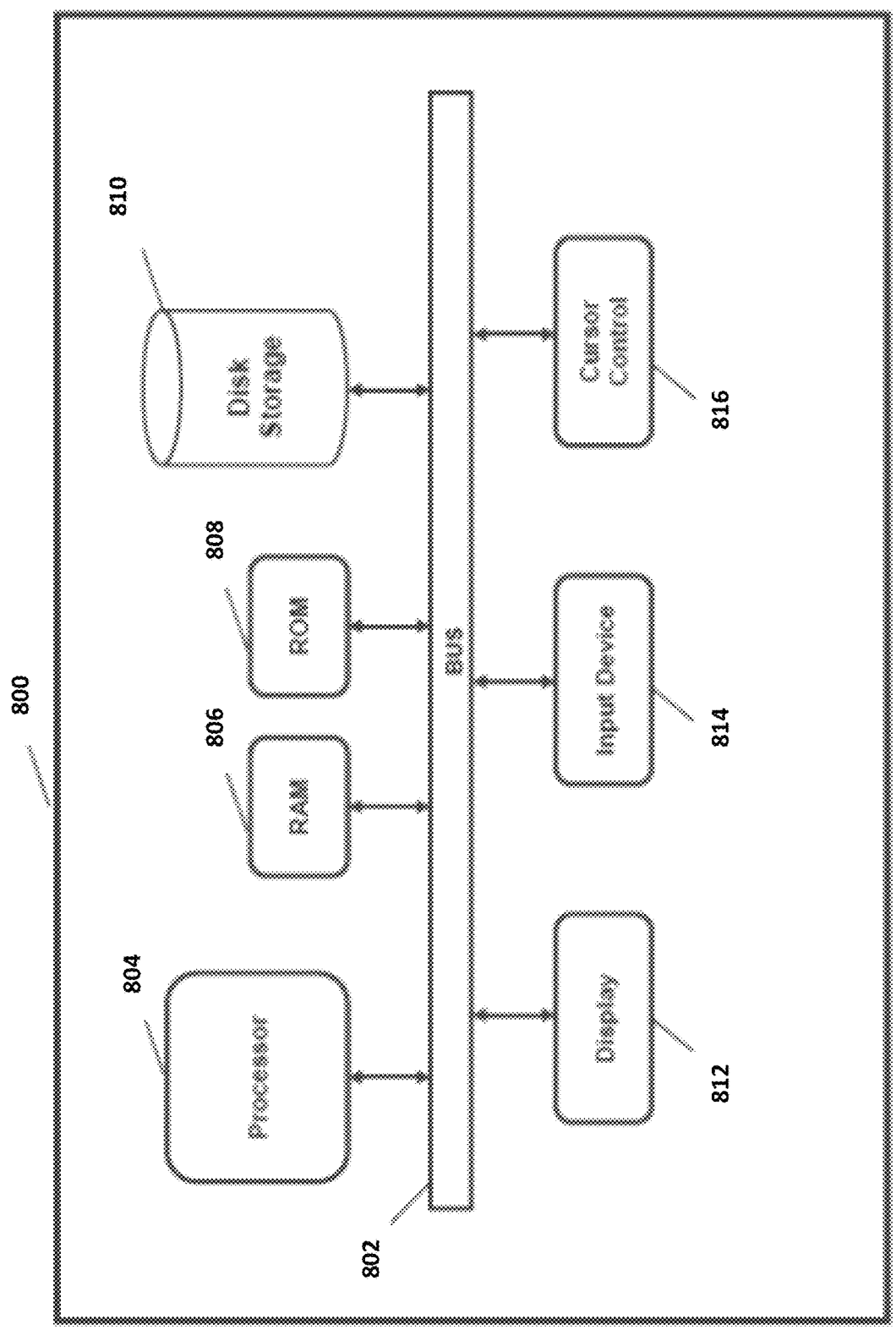
FIG. 8 is a block diagram that illustrates a computer system, upon which embodiments, or portions of the embodiments may be implemented, in accordance with various embodiments.

FIG. 8 is a block diagram that illustrates a computer system 800, upon which embodiments of the present teachings may be implemented. In various embodiments of the present teachings, computer system 800 can include a bus 802 or other communication mechanism for communicating information, and a processor 804 coupled with bus 802 for processing information. In various embodiments, computer system 800 can also include a memory, which can be a random access memory (RAM) 806 or other dynamic storage device, coupled to bus 802 for determining instructions to be executed by processor 804. Memory also can be used for storing temporary variables or other intermediate information during execution of instructions to be executed by processor 804. In various embodiments, computer system 800 can further include a read only memory (ROM) 808 or other static storage device coupled to bus 802 for storing static information and instructions for processor 804. A storage device 810, such as a magnetic disk or optical disk, can be provided and coupled to bus 802 for storing information and instructions.

In various embodiments, computer system 800 can be coupled via bus 802 to a display 812, such as a cathode ray tube (CRT) or liquid crystal display (LCD), for displaying information to a computer user. An input device 814, including alphanumeric and other keys, can be coupled to bus 802 for communicating information and command selections to processor 804. Another type of user input device is a cursor control 816, such as a mouse, a trackball or cursor direction keys for communicating direction information and command selections to processor 804 and for controlling cursor movement on display 812. This input device 814 typically has two degrees of freedom in two axes, a first axis (i.e., x) and a second axis (i.e., y), that allows the device to specify positions in a plane. However, it should be understood that input devices 814 allowing for 3 dimensional (x, y and z) cursor movement are also contemplated herein.

Consistent with certain implementations of the present teachings, results can be provided by computer system 800 in response to processor 804 executing one or more sequences of one or more instructions contained in memory 806. Such instructions can be read into memory 806 from another computer-readable medium or computer-readable storage medium, such as storage device 810. Execution of the sequences of instructions contained in memory 806 can cause processor 804 to perform the processes described herein. Alternatively hard-wired circuitry can be used in place of or in combination with software instructions to implement the present teachings. Thus implementations of the present teachings are not limited to any specific combination of hardware circuitry and software.

The term "computer-readable medium" (e.g., data store, data storage, etc.) or "computer-readable storage medium" as used herein refers to any media that participates in providing instructions to processor 804 for execution. Such a medium can take many forms, including but not limited to, non-volatile media, volatile media, and transmission media.

Examples of non-volatile media can include, but are not limited to, optical, solid state, magnetic disks, such as storage device 810. Examples of volatile media can include, but are not limited to, dynamic memory, such as memory 806. Examples of transmission media can include, but are not limited to, coaxial cables, copper wire, and fiber optics, including the wires that comprise bus 802.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, PROM, and EPROM, a FLASH-EPROM, any other memory chip or cartridge, or any other tangible medium from which a computer can read.

In addition to computer readable medium, instructions or data can be provided as signals on transmission media included in a communications apparatus or system to provide sequences of one or more instructions to processor 804 of computer system 800 for execution. For example, a communication apparatus may include a transceiver having signals indicative of instructions and data. The instructions and data are configured to cause one or more processors to implement the functions outlined in the disclosure herein. Representative examples of data communications transmission connections can include, but are not limited to, telephone modem connections, wide area networks (WAN), local area networks (LAN), infrared data connections, NFC connections, etc.

It should be appreciated that the methodologies described herein flowcharts, diagrams and accompanying disclosure can be implemented using computer system 800 as a stand-alone device or on a distributed network of shared computer processing resources such as a cloud computing network.

The methodologies described herein may be implemented by various means depending upon the application. For example, these methodologies may be implemented in hardware, firmware, software, or any combination thereof. For a hardware implementation, the processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

In various embodiments, the methods of the present teachings may be implemented as firmware and/or a software program and applications written in conventional programming languages such as C, C++, Python, etc. If implemented as firmware and/or software, the embodiments described herein can be implemented on a non-transitory computer-readable medium in which a program is stored for causing a computer to perform the methods described above. It should be understood that the various engines described herein can be provided on a computer system, such as computer system 800, whereby processor 804 would execute the analyses and determinations provided by these engines, subject to instructions provided by any one of, or a combination of, memory components 806/808/810 and user input provided via input device 814.

While the present teachings are described in conjunction with various embodiments, it is not intended that the present teachings be limited to such embodiments. On the contrary, the present teachings encompass various alternatives, modifications, and equivalents, as will be appreciated by those of skill in the art.

In describing the various embodiments, the specification may have presented a method and/or process as a particular sequence of steps. However, to the extent that the method or process does not rely on the particular order of steps set forth herein, the method or process should not be limited to the particular sequence of steps described, and one skilled in the art can readily appreciate that the sequences may be varied and still remain within the spirit and scope of the various embodiments.

Recitation of Selected Embodiments

Embodiment 1. A method for matching character strings to a reference character string, comprising:

receiving, by one or more processors, a plurality of character strings;

matching, by the one or more processors, each of the plurality of character strings to a main reference character string and registering a match to positions on the main reference character string that satisfy a pre-set match criteria;

matching, by the one or more processors, each of the plurality of character strings to an alternate reference character string and registering a match to positions on the alternate reference character string that satisfy the pre-set match criteria, wherein the alternate reference character string is derived from the main character string; and identifying, by the one or more processors, a match for each of the plurality of character strings that match to either a position on the main reference character string or the alternate reference character string.

Embodiment 2. The method of Embodiment 1, further including:

generating, by the one or more processors, a second alternate reference character string when an attribute is detected once a character string is matched with either the main reference character string or the alternate reference character string.

Embodiment 3. The method of Embodiment 1, wherein each of the plurality of character strings is a polynucleotide sequence.

Embodiment 4. The method of Embodiment 1, wherein the main reference character string is a reference genome sequence.

Embodiment 5. The method of Embodiment 4, wherein the reference genome sequence is a population reference genome sequence.

Embodiment 6. The method of Embodiment 1, wherein the alternate reference character string differs from the main reference character string by at least one character.

Embodiment 7. The method of Embodiment 1, wherein the pre-set match criteria is a set number of mismatched characters between each of the plurality of character strings and the main reference character string or alternate reference character string.

Embodiment 8. The method of Embodiment 1, wherein the pre-set match criteria is a number of matched characters between each of the plurality of character strings and the main reference character string or alternate reference character string.

Embodiment 9. The method of Embodiment 8, wherein the number of matched characters is a number of consecutive matched characters.

Embodiment 10. The method of Embodiment 1, wherein the pre-set match criteria is a set number derived from the mismatched characters between each of the plurality of character strings and the main reference character string or alternate reference character string.

Embodiment 11. The method of Embodiment 1, further including:

generating, by the one or more processors, a matching score for each of the plurality of character strings that match to either a position on the main reference character string or the alternate reference character string.

Embodiment 12. The method of Embodiment 10, further including:

calling, by the one or more processors, a definitive match for a character string that is matched to both the main reference character string and the alternate reference character string, based on highest matching score for the matched character string.

Embodiment 13. The method of Embodiment 10, further including:

calling, by the one or more processors, a definitive match for a character string that is matched to more than one alternative reference character string, based on highest matching score for the matched character string.

Embodiment 14. The method of Embodiment 2, wherein the attribute is a single character mismatch.

Embodiment 15. The method of Embodiment 2, wherein the attribute is a plurality of character mismatches to the main reference character string or alternate reference character string.

Embodiment 16. The method of Embodiment 14, wherein the single character mismatch is a single nucleotide polymorphism.

Embodiment 17. The method of Embodiment 15, wherein the plurality of character mismatches is due to an inversion.

Embodiment 18. The method of Embodiment 15, wherein the plurality of character mismatches is due to an insertion.

Embodiment 19. The method of Embodiment 15, wherein the plurality of character mismatches is due to a deletion.

Embodiment 20. The method of Embodiment 15, wherein the plurality of character mismatches is due to a duplication.

Embodiment 21. The method of Embodiment 15, wherein the plurality of character mismatches is due to a translocation.

Embodiment 22. A non-transitory computer-readable medium storing computer instructions for matching character strings to a reference character string, comprising:

receiving, by one or more processors, a plurality of character strings;

matching, by the one or more processors, each of the plurality of character strings to a main reference character string and registering a match to positions on the main reference character string that satisfy a pre-set match criteria;

matching, by the one or more processors, each of the plurality of character strings to an alternate reference character string and registering a match to positions on the alternate reference character string that satisfy the pre-set match criteria, wherein the alternate reference character string is derived from the main character string; and identifying, by the one or more processors, a match for each of the plurality of character strings that match to either a position on the main reference character string or the alternate reference character string.

Embodiment 23. A system for matching character strings to a reference character string, comprising:

a data store configured to store a plurality of character strings;

a computing device communicatively connected to the data store, comprising, a main path index store configured to store a main reference character string, an alternate path index store configured to store one or more alternate reference character strings, and a matching engine configured to:

receive the plurality of character strings, the main reference character string and one or more alternate reference character strings, match each of the plurality of character strings to the main reference character string and register a match to positions on the main reference character string that satisfy a pre-set match criteria, match each of the plurality of character strings to the alternate reference character string and register a match to positions on the alternate reference character string that satisfy the pre-set match criteria, wherein the alternate reference character string is derived from the main character string; and identify a match for each of the plurality of character strings that match to either a position on the main reference character string or the alternate reference character string; and a display communicatively connected to the computing device and configured to display a report or graphic containing the matched character strings.

Embodiment 24. The system of Embodiment 23, further including:

an alternate reference character string generation engine configured to generate a second alternate reference character string when an attribute is detected once a character string is matched with either the main reference character string or the alternate reference character string.

Embodiment 25. The system of Embodiment 23, wherein each of the plurality of character strings is a polynucleotide sequence.

Embodiment 26. The system of Embodiment 23, wherein the main reference character string is a reference genome sequence.

Embodiment 27. The system of Embodiment 26, wherein the reference genome sequence is a population reference genome sequence.

Embodiment 28. The system of Embodiment 23, wherein the alternate reference character string differs from the main reference character string by at least one character.

Embodiment 29. The system of Embodiment 23, wherein the pre-set match criteria is a set number of mismatched characters between each of the plurality of character strings and the main reference character string or alternate reference character string.

Embodiment 30. The system of Embodiment 23, wherein the pre-set match criteria is a number of matched characters between each of the plurality of character strings and the main reference character string or alternate reference character string.

Embodiment 31. The system of Embodiment 30, wherein the number of matched characters is number of consecutive matched characters.

Embodiment 32. The system of Embodiment 23, wherein the pre-set match criteria is a set number derived from the mismatched characters between each of the plurality of character strings and the main reference character string or alternate reference character string.

Embodiment 33. The system of Embodiment 23, wherein the matching engine is further configured to generate a matching score for each of the plurality of character strings that match to either a position on the main reference character string or the alternate reference character string.

Embodiment 34. The system of Embodiment 23, wherein the matching engine is further configured to call a definitive match for a character string that is matched to both the main reference character string and the alternate reference character string, based on highest matching score for the matched character string.

Embodiment 35. The system of Embodiment 23, wherein the matching engine is further configured to call a definitive match for a character string that is matched to more than one alternative reference character string, based on highest matching score for the matched character string.

Embodiment 36. The system of Embodiment 24, wherein the attribute is a single character mismatch.

Embodiment 37. The system of Embodiment 24, wherein the attribute is a plurality of character mismatches to the main reference character string or alternate reference character string.

Embodiment 38. The system of Embodiment 36, wherein the single character mismatch is a single nucleotide polymorphism.

Embodiment 39. The method of Embodiment 37, wherein the plurality of character mismatches is due to an inversion.

Embodiment 40. The method of Embodiment 37, wherein the plurality of character mismatches is due to an insertion.

Embodiment 41. The method of Embodiment 37, wherein the plurality of character mismatches is due to a deletion.

Embodiment 42. The method of Embodiment 37, wherein the plurality of character mismatches is due to a duplication.

Embodiment 43. The method of Embodiment 37, wherein the plurality of character mismatches is due to a translocation.

Embodiment 44. The system of Embodiment 23, wherein the data store and the computing device are part of an integrated apparatus.

Embodiment 45. The system of Embodiment 23, wherein the data store is hosted by a different device than the computing device.

Embodiment 46. The system of Embodiment 23, wherein the data store and the computing device are part of a distributed network system.

What is claimed is:

1. A method for matching character strings to a reference character string, comprising:
   receiving, by one or more processors, a plurality of character strings;
   matching, by the one or more processors, each of the plurality of character strings to a main reference character string and registering a match to positions on the main reference character string that satisfy pre-set match criteria;
   matching, by the one or more processors, each of the plurality of character strings to an alternate reference character string and registering a match to positions on the alternate reference character string that satisfy the pre-set match criteria, wherein the alternate reference character string is derived from the main reference character string; and
   identifying, by the one or more processors, a match for each of the plurality of character strings that match to either a position on the main reference character string or the alternate reference character string.

2. The method of claim 1, further including:
   generating, by the one or more processors, a second alternate reference character string when an attribute is detected once a character string is matched with either the main reference character string or the alternate reference character string.

3. The method of claim 1, wherein the pre-set match criteria is a set number of mismatched characters between each of the plurality of character strings and the main reference character string or the alternate reference character string.

4. The method of claim 1, wherein the pre-set match criteria is a number of matched characters between each of the plurality of character strings and the main reference character string or the alternate reference character string.

5. The method of claim 1, wherein the pre-set match criteria is a set number derived from mismatched characters between each of the plurality of character strings and the main reference character string or the alternate reference character string.

6. The method of claim 1, further including:
   generating, by the one or more processors, a matching score for each of the plurality of character strings that matches to either a position on the main reference character string or the alternate reference character string.

7. The method of claim 5, further including:
   calling, by the one or more processors, a definitive match for a character string that is matched to both the main reference character string and the alternate reference character string, based on a highest matching score for the definitely matched character string.

8. The method of claim 5, further including:
   calling, by the one or more processors, a definitive match for a character string that is matched to more than one alternative reference character string, based on a highest matching score for the definitely matched character string.

9. The method of claim 2, wherein the attribute is a single character mismatch.

10. The method of claim 2, wherein the attribute is a plurality of character mismatches to the main reference character string or the alternate reference character string.

11. A non-transitory computer-readable medium storing computer instructions for matching character strings to a reference character string, comprising:
    receiving, by one or more processors, a plurality of character strings;
    matching, by the one or more processors, each of the plurality of character strings to a main reference character string and registering a match to positions on the main reference character string that satisfy pre-set match criteria;
    matching, by the one or more processors, each of the plurality of character strings to an alternate reference character string and registering a match to positions on the alternate reference character string that satisfy the pre-set match criteria, wherein the alternate reference character string is derived from the main reference character string; and
    identifying, by the one or more processors, a match for each of the plurality of character strings that match to either a position on the main reference character string or the alternate reference character string.

12. A system for matching character strings to a reference character string, comprising:
    a data storage for storing a plurality of character strings;
    a computing device communicatively connected to the data storage, comprising,
      a main path index store configured to store a main reference character string,
      an alternate path index store configured to store one or more alternate reference character strings, and
      a matching engine configured to:
        receive the plurality of character strings, the main reference character string and one or more alternate reference character strings,
        match each of the plurality of character strings to the main reference character string and register a match to positions on the main reference character string that satisfy a pre-set match criteria,
        match each of the plurality of character strings to the alternate reference character string and register a match to positions on the alternate reference character string that satisfy the pre-set match criteria, wherein the alternate reference character string is derived from the main reference character string; and
        identify a match for each of the plurality of character strings that match to either a position on the main reference character string or the alternate reference character string; and
    a display communicatively connected to the computing device and configured to display a report or graphic containing the matched character strings.

13. The system of claim 12, further including:
    an alternate reference character string generation engine configured to generate a second alternate reference character string when an attribute is detected once a character string is matched with either the main reference character string or the alternate reference character string.

14. The system of claim 12, wherein the pre-set match criteria is a set number of mismatched characters between each of the plurality of character strings and the main reference character string or alternate reference character string.

15. The system of claim 12, wherein the pre-set match criteria is a number of matched characters between each of the plurality of character strings and the main reference character string or alternate reference character string.

16. The system of claim 12, wherein the pre-set match criteria is a set number derived from the mismatched characters between each of the plurality of character strings and the main reference character string or alternate reference character string.

17. The system of claim 12, wherein the matching engine is further configured to generate a matching score for each of the plurality of character strings that match to either a position on the main reference character string or the alternate reference character string.

18. The system of claim 12, wherein the matching engine is further configured to call a definitive match for a character string that is matched to both the main reference character string and the alternate reference character string, based on highest matching score for the matched character string.

19. The system of claim 12, wherein the matching engine is further configured to call a definitive match for a character string that is matched to more than one alternative reference character string, based on highest matching score for the matched character string.

20. The system of claim 13, wherein the attribute is a single character mismatch.

21. The system of claim 13, wherein the attribute is a plurality of character mismatches to the main reference character string or alternate reference character string.

* * * * *